US009515496B1

(12) United States Patent
Ying

(10) Patent No.: US 9,515,496 B1
(45) Date of Patent: Dec. 6, 2016

(54) BATTERY MANAGEMENT SYSTEM FOR HUMAN-MACHINE INTERACTION VEHICLES

(71) Applicant: HANGZHOU CHIC INTELLIGENT TECHNOLOGY CO., LTD, Hangzhou (CN)

(72) Inventor: Jiawei Ying, Hangzhou (CN)

(73) Assignee: HANGZHOU CHIC INTELLIGENT TECHNOLOGY CO., LTD, Hangzhou, Zhejiang Province (CN)

( * ) Notice: Subject to any disclaimer, the term of this patent is extended or adjusted under 35 U.S.C. 154(b) by 0 days.

(21) Appl. No.: 15/139,380

(22) Filed: Apr. 27, 2016

(30) Foreign Application Priority Data

Mar. 21, 2016 (CN) .......................... 2016 1 0160755
Mar. 21, 2016 (CN) .......................... 2016 1 0162243

(51) Int. Cl.
*H02J 7/00* (2006.01)

(52) U.S. Cl.
CPC ............ *H02J 7/0014* (2013.01); *H02J 7/0068* (2013.01)

(58) Field of Classification Search
USPC ....................................................... 320/136
See application file for complete search history.

(56) References Cited

U.S. PATENT DOCUMENTS

| 5,493,197 A * | 2/1996 | Eguchi .................. H02J 7/0031 320/116 |
| 5,563,493 A * | 10/1996 | Matsuda ................. G06F 1/263 320/124 |
| 5,659,240 A * | 8/1997 | King ..................... B60L 3/0046 320/134 |
| 6,133,711 A | 10/2000 | Hayashi et al. |
| 2004/0080406 A1 | 4/2004 | Huang |
| 2009/0295334 A1 | 12/2009 | Yang et al. |
| 2010/0097035 A1 * | 4/2010 | Buchholz ............... H02J 7/0031 320/134 |
| 2010/0194340 A1 | 8/2010 | Lim |
| 2010/0194398 A1 | 8/2010 | Kawasumi et al. |
| 2011/0156655 A1 * | 6/2011 | Kim .................... H01M 10/441 320/134 |
| 2014/0203781 A1 * | 7/2014 | Yun ........................ H02J 7/042 320/112 |
| 2016/0033581 A1 | 2/2016 | Sunaga |

* cited by examiner

*Primary Examiner* — Samuel Berhanu
(74) *Attorney, Agent, or Firm* — Ladas & Parry LLP

(57) ABSTRACT

A battery management system for human-machine interaction vehicles includes a battery pack, and an information sampling module. The management module determines whether the cell is abnormal according to the information signal. When the cell is abnormal, the discharge switch is turned off during the cell being discharged and the charge switch is turned off during the cell being charged.

17 Claims, 2 Drawing Sheets

BATTERY MANAGEMENT SYSTEM FOR HUMAN-MACHINE INTERACTION VEHICLES

CROSS-REFERENCE TO RELATED APPLICATIONS

This application claims priority to Chinese Patent Application Nos. 201610160755.7 and 201610162243.4 filed on Mar. 21, 2016, the contents of which are incorporated by reference herein in their entirety.

FIELD

The subject matter herein generally relates to human-machine interaction vehicles, in particular to battery management systems for human-machine interaction vehicles.

BACKGROUND

Human-machine interaction vehicles are also called body feeling vehicles or sensor-controlled vehicles. As the traffic congestion in cities is getting increasingly serious, human-machine interaction vehicles are becoming more and more popular. The human-machine interaction vehicles are generally used in a short distance, such as within ten kilometers. And they generally have a small size.

To provide sufficient power, lithium-ion batteries are typically used to supply power in conventional human-machine interaction vehicles. However, the temperature of a lithium-ion battery may exceed the scope of the specification when the battery is being charged or discharged. It is thus necessary to provide a safe battery management system for human-machine interaction vehicles.

SUMMARY OF THE DISCLOSURE

In view of the above, a purpose of the disclosure is to provide a safe battery management system for human-machine interaction vehicles.

A battery management system may include a battery pack and an information sampling module. The battery pack may include a cell, a battery pack charge-discharge module, a management module, a discharge switch, and a charge switch. The information sampling module may sample information of the cell and transmit an information signal to the battery pack management module. The cell may be connected to a discharge terminal of the battery pack charge-discharge module through the discharge switch. A control terminal of the discharge switch may be connected to the management module. The cell may be connected to a charge terminal of the battery pack charge-discharge module through the charge switch. A control terminal of the charge switch may be connected to the management module. The management module may determine whether the cell is abnormal according to the information signal. When the cell is determined to be abnormal, the discharge switch may be turned off during the cell being discharged and the charge switch may be turned off during the cell being charged.

In at least one embodiment, the information sampling module may include a temperature sampling unit configured for sampling temperature of the cell and transmitting a temperature signal to the management module. The management module may determine whether the temperature of the cell is higher than a preset temperature. When the temperature of the cell is determined to be higher than the preset temperature, the management module may turn off the discharge switch during the cell being discharged, and may turn off the charge switch during the cell being charged.

In at least one embodiment, the information sampling module may further include a voltage sampling unit. The voltage sampling unit may be connected to the cell and the management module and configured to sample a voltage of the cell and transmit a voltage signal to the management module. When the management module determines that the voltage of the cell is out of a predetermined range, the discharge switch may be turned off by the management module during the cell being discharged, and the charge switch may be turned off by the management module during the cell being charged.

In at least one embodiment, the information sampling module may further include a current sampling unit. The current sampling unit may be connected to the cell and the management module and configured to sample a current of the cell and transmit a current signal to the management module. When the management module determines that the current of the cell is out of a predetermined range, the discharge switch may be turned off by the management module during the cell being discharged, and the charge switch may be turned off by the management module during the cell being charged.

In at least one embodiment, the battery management system may further include a main control board. The main control board may include a main control module and a warning module. The main control module may be connected to the management module. The management module may further transmit the information signal, from the information sampling module, to the main control module. The main control module may determine whether the cell is abnormal according to the information signal. The main control module may control the warning module to emit alarm signals when the cell is determined to be abnormal.

In at least one embodiment, the battery management system may further include a main control board. The main control board may include a main control module and a display module. The main control module may be connected to the management module. The management module may further transmit the information signal, from the information sampling module, to the main control module. The main control module may determine whether the cell is abnormal according to the information signal. The main control module may control the display module to display the cell information sent from the management module when the cell is determined to be abnormal.

In at least one embodiment, the main control board may further include a first communication module connected to the main control module. The battery pack may further include a second communication module connected to the management module. The first communication module may be connected to the second communication module.

In at least one embodiment, the main control board may further include an external energy source interface and a main charge-discharge module. The main charge-discharge module may be connected to the external energy source interface. The main charge-discharge module may be connected to the battery pack charge-discharge module.

In at least one embodiment, the discharge switch may be a discharge metal-oxide-semiconductor field-effect transistor (MOSFET), and the charge switch may be a charge MOSFET.

Compared with the prior art, the battery management system uses an information sampling module to sample the information of the cell, which is then transmitted to a main control module. The main control module may determine whether the cell information is abnormal. When the cell information is determined abnormal, a corresponding charge or discharge switch may be turned off. Thus, the battery explosion due to excessive temperature can be effectively avoided.

DETAILED DESCRIPTION

The following embodiments are meant to merely illustrate, but not to limit, the present disclosure with reference to the accompanying drawings. Obviously, bearing the essence and concept of the disclosure, those of skill in the art can make various changes and modifications. It should be understood that these changes and modifications shall all be covered by the disclosure, if they are made without departing from the spirits and scope of the disclosure.

It should also be understood that terms such as "first", "second", etc. are used to merely denote but not to limit the devices. For instance, the description hereafter may use "first" to denote one device, and use "second" to denote the same device. Note that when the phrase of "connected to" is used hereinafter, it can mean two devices either "being connected to each other" or "being connected to another device in between". Otherwise, when the phrase of "directly connected to" is used hereinafter, it can mean "being connected without any intermediate device".

The terms being used hereinafter are meant to describe the referenced embodiments but not to limit the disclosure. Unless otherwise stated in contexts, the use of singular or plural forms would not limit the disclosure.

It should further be understood that the use of "comprise" shall not limit the disclosure to the described or listed features and characteristics of a circuit. There may exist other features and characteristics of the circuit which have not been covered or listed in the disclosure.

Figure 1:
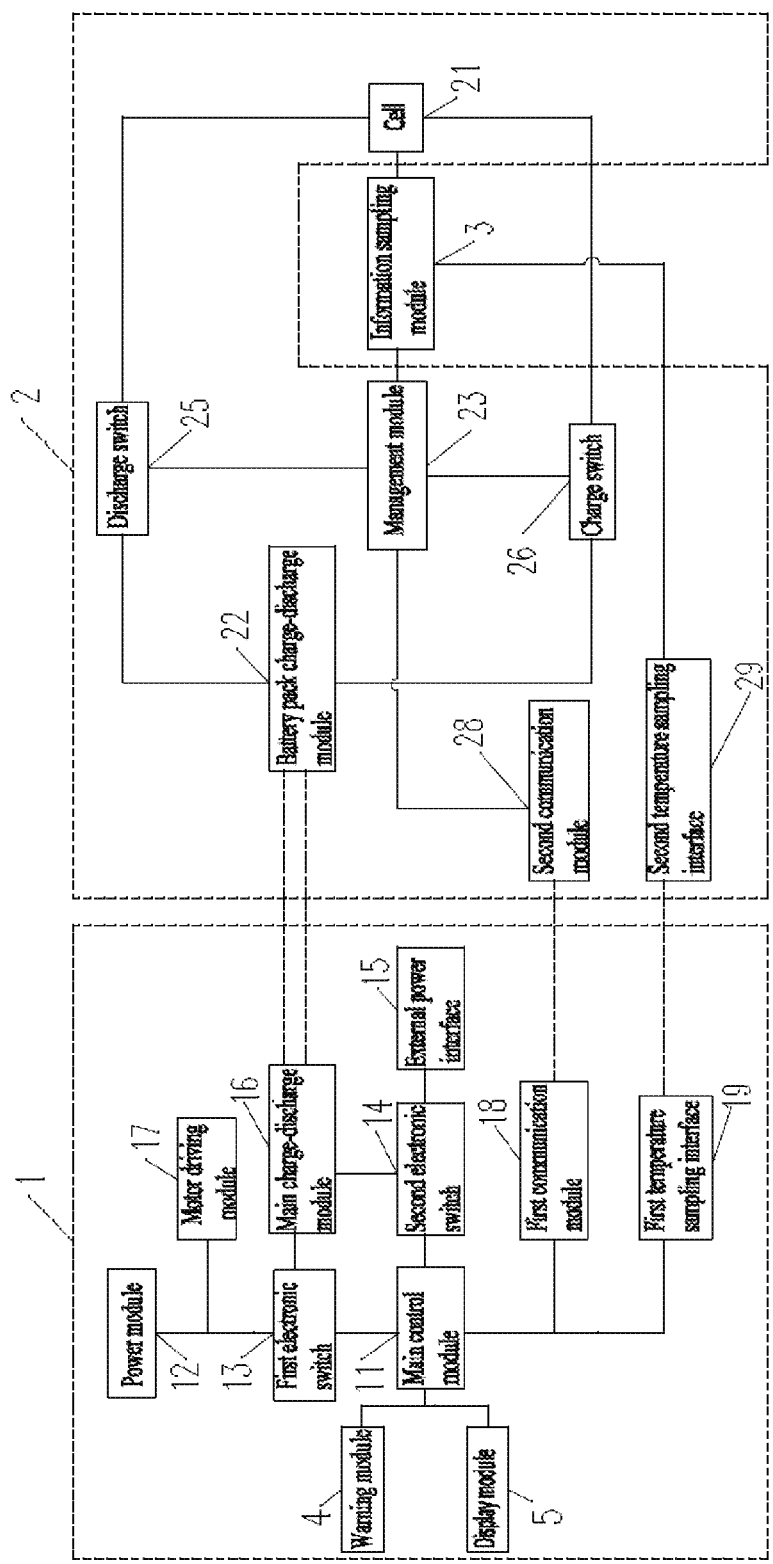
FIG. 1 shows a block diagram illustrating a battery management system for a human-machine interaction vehicle according to an embodiment of the present disclosure.
Figure 2:
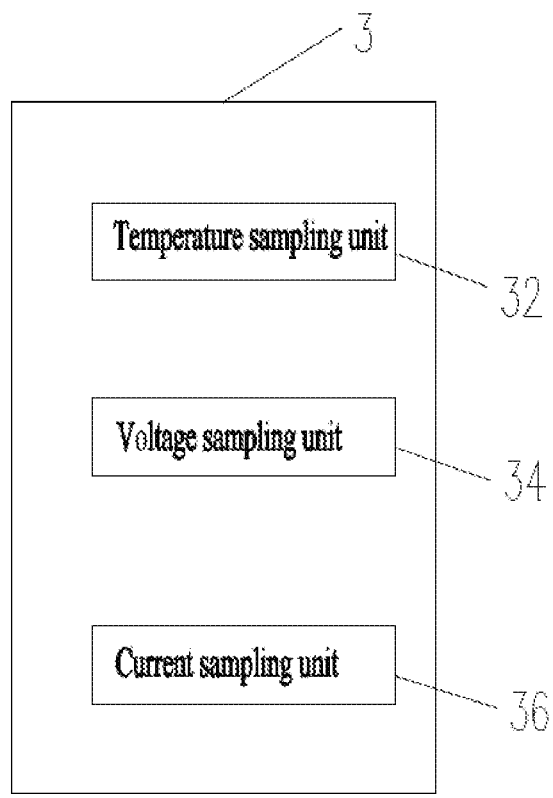
FIG. 2 shows a block diagram illustrating an information sampling module of the battery management system shown in FIG. 1.

FIGS. 1 and 2 illustrate a battery management system for human-machine interaction vehicles in accordance with a first embodiment. The battery management system includes a main control board 1, a battery pack 2, and an information sampling module 3.

The main control board 1 may include a main control module 11, a first electronic switch 13, a second electronic switch 14, an external energy source interface 15, and a main charge-discharge module 16. The battery pack 2 may include a cell 21, a battery pack charge-discharge module 22, a management module 23, a discharge switch 25, and a charge switch 26.

A control terminal of the first electronic switch 13 may be connected to the main control module 11. An input terminal of the first electronic switch 13 may be connected to a discharge terminal of the main charge-discharge module 16. An output terminal of the first electronic switch 13 may be configured to connect to loads. In this embodiment, the main control module 11 may be a main control central processing unit (CPU) mounted on the main control board 1 of the human-machine interaction vehicle. The loads may include a power module 12 mounted on the main control board 1 and a motor driving module 17. The main charge-discharge module 16 may be connected to the cell 21 through the battery pack charge-discharge module 22. The main control module 11 may control the first electronic switch 13. When the first electronic switch 13 is turned on, the cell 21 may supply power to the power module 12 and the motor driving module 17.

The cell 21 may be connected to a discharge terminal of the battery pack charge-discharge module 22 through the discharge switch 25. A control terminal of the discharge switch 25 may be connected to the management module 23. The management module 23 may control the discharge switch 25. When the cell 21 supplies power to the power module 12 and the motor driving module 17, both the first electronic switch 13 and the discharge switch 25 are turned on. In other embodiments, the discharge terminal of the battery pack charge-discharge module may be connected to the cell 21 directly. In this manner, the main control module 11 may control the first electronic switch 13 to enable the cell 21 to supply power or otherwise. Alternatively, the first electronic switch 13 can be omitted. The power module 12 and the motor driving module 17 may then be connected to a discharge terminal of the main charge-discharge module 16, and the discharge terminal of the battery pack charge-discharge module 22 may be connected to the cell 21 through the discharge switch 25. In this manner, the management module 23 can control the discharge switch 25 to enable the cell 21 to supply power or otherwise.

A control terminal of the second electronic switch 14 may be connected to the main control module 11. An input terminal of the second electronic switch 14 may be connected to an external energy source interface 15. An output terminal of the second electronic switch 14 may be connected to a charge terminal of the main charge-discharge module 16. The main control module 11 may control the second electronic switch 14. When the external energy source interface 15 is connected to an external power supply and the second electronic switch 14 is turned on, the external power can charge the cell 21. In this embodiment, a charge terminal of the battery pack charge-discharge module 22 may be connected to the cell 21 through the charge switch 26. A control terminal of the charge switch 26 may be connected to the management module 23. The management module 23 may control the charge switch 26. When the second electronic switch 14 and the charge switch 26 are simultaneously turned on, the cell 21 can be charged. In other embodiments, the charge terminal of the battery pack charge-discharge module 22 can be connected to the cell 21 directly. In this manner, the main control module 11 can control the second electronic switch 14 to enable the cell 21 to be charged or otherwise. Alternatively, the second electronic switch 14 can be omitted. The external energy source interface 15 may then be also connected to the charge terminal of the main charge-discharge module 16. The charge terminal of the battery pack charge-discharge module 22 may be connected to the cell 21 through the charge switch 26. In this manner, the management module 23 can control the charge switch 26 to enable the cell 21 to be charged or otherwise.

The information sampling module 3 may be fitted into the battery pack 2, and connected to the main control module 11. The information sampling module 3 may sample the information of the cell 21 and transmit an information signal to the main control module 11. The main control module 11 may then determine whether the information sampled by the information sampling module 3 is abnormal. When the information of the cell 21 is determined to be abnormal, the first electronic switch 13 or the second electronic switch 14 may be turned off. More specifically, when the cell 21 is being discharged, the first electronic switch 13 may be turned off; when it is being charged, the second electronic switch 14 may be turned off.

In further detail, the information sampling module 3 may be connected to the management module 23 and configured to sample information of the cell 21 and transmit the information to the main control module 11 through the management module 23. The management module 23 may also determine whether the cell 21 is abnormal. If the cell 21 is abnormal, the discharge switch 25 may be turned off when the cell 21 is being discharged; and the charge switch 26 may be turned off when the cell 21 is being charged.

In this embodiment, the information sampling module 3 may include a temperature sampling unit 32. The temperature sampling unit 32 may be connected to the management module 23. The temperature sampling unit 32 may sample the temperature of the cell 21 and transmit a temperature signal to the management module 23 and the main control module 11. The main control module 11 may then determine whether the temperature of the cell 21 is higher than a preset temperature. When the temperature of the cell 21 is higher than the preset temperature, the first electronic switch 13 or the second electronic switch 14 may be turned off. More specifically, when the cell 21 is being discharged, the first electronic switch 13 may be turned off; when it is being charged, the second electronic switch 14 may be turned off.

The management module 23 may further determine whether the temperature of the cell 21 sampled by the temperature sampling unit 32 is higher than the preset temperature. When the temperature of the cell 21 is higher than the preset temperature, the discharge switch 25 or the charge switch 26 may be turned off. More specifically, when the cell 21 is being discharged, the discharge switch 25 may be turned off; when the cell 21 is being charged, the charge switch 26 may be turned off. The preset temperature may be determined based on characteristics of the cell 21. The temperature sampling unit 32 may be a contact-type temperature sensor. The contact-type temperature sensor may be fitted onto a surface of the cell 21.

In this embodiment, the information sampling module 3 may further include a voltage sampling unit 34. The voltage sampling unit 34 may be connected to the cell 21 and the management module 23 and configured to sample a voltage of the cell 21 and transmit a voltage signal to the management module 23 and the main control module 11. When the cell 21 is being discharged, the voltage sampled by the voltage sampling unit 34 may be an output voltage of the cell 21. When the management module 23 determines that the output voltage of the cell 21 is out of a predetermined range, the first electronic switch 13 may be turned off. Otherwise, when the cell 21 is being charged, the voltage sampled by the voltage sampling unit 34 may be an input voltage of the cell 21. When the management module 23 determines that the input voltage of the cell 21 is out of a predetermined range, the second electronic switch 14 may be turned off.

The management module 23 may further determine whether a voltage sampled by the voltage sampling unit 34 is abnormal. Specifically, when the cell 21 is being discharged, the voltage sampled by the voltage sampling unit 34 may be the output voltage of the cell 21. When the management module 23 determines that the output voltage of the cell 21 is out of the predetermined range, the discharge switch 25 may be turned off. When the cell 21 is being charged, the voltage sampled by the voltage sampling unit 34 may be the input voltage of the cell 21. When the management module 23 determines that the input voltage of the cell 21 is out of the predetermined range, the charge switch 26 may be turned off.

In this embodiment, the information sampling module 3 may further include a current sampling unit 36. The current sampling unit 36 may be connected to the cell 21 and the management module 23 and configured to sample a current flowing through the cell 21 and transmit a current signal to the main control module 11 and the management module 23. Specifically, when the cell 21 is being discharged, the current sampled by the current sampling unit 36 may be an output current of the cell 21. When the management module 23 determines that the output current of the cell 21 is out of a predetermined range, the first electronic switch 13 may be turned off. When the cell 21 is being charged, the current sampled by the current sampling unit 36 is an input current of the cell 21. When the management module 23 determines that the input current of the cell 21 is out of a predetermined range, the second electronic switch 14 may be turned off.

The management module 23 may further determine whether the current sampled by the current sampling unit 36 is abnormal. Specifically, when the cell 21 is being discharged, the current sampled by the current sampling unit 36 is the output current of the cell 21. When the management module 23 determines that the output current of the cell 21 is out of the predetermined range, the discharge switch 25 may be turned off. When the cell 21 is being charged, the current sampled by the current sampling unit 36 may be the input current of the cell 21. When the management module 23 determines that the input current of the cell 21 is out of the predetermined range, the charge switch 26 may be turned off.

After an on-off switch of the human-machine interaction vehicle is turned on, the main control module 11 may turn on the first electronic switch 13, and the management module 23 may turn on the discharge switch 25. The cell 21 may thus supply power to the power module 12 and the motor driving module 17. As a result, the power module 12 can supply power to the human-machine interaction vehicle. Specifically, the power module 12 may convert a voltage outputted from the cell 21 to a 12-volt direct current (DC) voltage, 5-volt DC voltage, or 3.3-volt DC voltage, and thus supply power to the human-machine interaction vehicle.

When the cell 21 is being discharged, the temperature sampling unit 32 may sample the temperature of the cell 21 and transmit a temperature signal to the main control module 11 and the management module 23. When the main control module 11 determines that the temperature of the cell 21 is higher than a preset temperature, the main control module 11 may turn off the first electronic switch 13. When the management module 23 determines that the temperature of the cell 21 is higher than the preset temperature, the management module 23 may turn off the discharge switch 25. When the external energy source interface 15 is connected to an external power supply, the main control module 11 may turn on the second electronic switch 14, and the management module 23 may turn on the charge switch 26. Thus, the cell 21 can be charged.

During the cell 21 being charged, the temperature sampling unit 32 may sample the temperature of the cell 21 and transmit a temperature signal to the main control module 11 and the management module 23. When the main control module 11 determines that the temperature of the cell 21 is higher than a preset temperature, the main control module 11 may turn off the second electronic switch 14. When the management module 23 determines that the temperature of the cell 21 is higher than the preset temperature, the management module 23 may turn off the charge switch 26.

In this embodiment, the main control board 1 may further include a first temperature sampling interface 19. The first temperature sampling interface 19 may be connected to the main control module 11. The battery pack 2 may further include a second temperature sampling interface 29. The second temperature sampling interface 29 may be connected to the first temperature sampling interface 19 to transmit the temperature signal sampled by the temperature sampling unit 32 to the main control module 11. The main control module 11 may further determine whether the temperature through the first and second temperature sampling interfaces is higher than the preset temperature.

In other embodiments, the main control board 1 may further include a first communication module 18. The first communication module 18 may be connected to the main control board 1. The battery pack 2 may include a second communication module 28. The second communication module 28 may be connected to the management module 23. The second communication module 28 may further be connected to the first communication module 18, to transmit the information signal of the cell 21 to the main control module 11. The main control module 11 may then further determine whether the information signal of the cell 21 is abnormal. When the main control module 11 determines that the information signal of the cell 21 is abnormal, the first electronic switch 13 may be turned off during the cell 21 being discharged, and the second electronic switch 14 may be turned off during the cell 21 being charged. In detail, the information of the cell 21 may include the temperature of the cell 21, the current of the cell 21, or the voltage of the cell 21. When the main control module 11 determines that the temperature of the cell 21 is higher than the preset temperature, the first electronic switch 13 may be turned off during the cell 21 being discharged, and the second electronic switch 14 may be turned off during the cell 21 being charged. When the main control module 11 determines that the voltage of the cell 21 is out of the predetermined range, the first electronic switch 13 may be turned off during the cell 21 being discharged, and the second electronic switch 14 may be turned off during the cell 21 being charged. When the main control module 11 determines that the current of the cell 21 is out of the predetermined range, the first electronic switch 13 may be turned off during the cell 21 being discharged, and the second electronic switch 14 may be turned off during the cell 21 being charged.

In other embodiments, the battery pack 2 may include a plurality of cells 21. Correspondingly, the information sampling module 3 may include a plurality of temperature sampling units 32, a plurality of voltage sampling units 34, and a plurality of current sampling units 36. Each cell 21 may correspond to an information sampling module 3, a temperature sampling unit 32, a voltage sampling unit 34, and a current sampling unit 36. In this manner, the main control module 11 can receive a plurality of temperature signals from the temperature sampling units 32, a plurality of voltage signals from the voltage sampling units 34, and a plurality of current signals from the current sampling units 36. When the main control module 11 determines that one of the temperature, voltage, or current of any one cell 21 is abnormal, the first electronic switch 13 may be turned off. When the management module 23 determines that one of the temperature, voltage, or current of any one cell 21 is abnormal, the charge switch 26 may be turned off.

In this embodiment, the main control board 1 may further include a warning module 4. The warning module 4 may be connected to the main control module 11. When the main control module 11 determines the information signal of the cell 21 indicates that the cell 21 is abnormal, the warning module 4 may be controlled by the main control module 11 to issue alarm signals. The warning module 4 may be a buzzer which may make a buzzing sound to alert the user. It should be pointed out that, when the information signal of the cell 21 is abnormal, it may indicate that the temperature of the cell 21 is higher than the preset temperature, the input/output voltage of the cell 21 is out of the predetermined range, or the input/output current of the cell 21 is out of the predetermined range.

In this embodiment, the main control board 1 may further include a display module 5. The display module 5 may be connected to the main control module 11 and configured to display the information of the cell 21. The information of the cell 21 may include the temperature of the cell 21, the input/output voltage of the cell 21, or the input/output current of the cell 21.

In this embodiment, the first electronic switch 13 and the second electronic switch 14 may be transistors. The control terminal of the first or second electronic switch may correspond to the base of the transistor. The output terminal of the first or second electronic switch may correspond to the emitter of the transistor. The input terminal of the first or second electronic switch may correspond to the collector of the transistor. The discharge switch 25 may be a discharge MOSFET (Metal-Oxide-Semiconductor. Field-Effect Transistor). The charge switch 26 may be a charge MOSFET.

In this embodiment, the main control board 1 may further include a sensor module and a motor driving module 17. The sensor module may be connected to the main control module 11. The motor driving module 17 may be connected to no pulse-width modulation (PWM) driving interface of the main control module 11. The sensor module may include, but is not limited to, gyroscopes, acceleration sensors, and hall sensors. The gyroscope can measure an angle of avertence of the human-machine interaction vehicle, and transmit the angle of avertence to the main control module 11. The main control module 11 may control the motion of the human-machine interaction vehicle accordingly. The acceleration sensor may measure an acceleration of the human-machine interaction vehicle. The hall sensor may be mounted on the wheels of the human-machine interaction vehicle, to measure a speed of the human-machine interaction vehicle. The hall sensor may further transmit the speed information to the main control module 11. The main control module 11 may thus receive and process the angle of avertence, the acceleration, and the speed data, and thus generate motor driving signals. The main control module 11 may transmit the motor driving signals to the motor driving module 17. The motor driving module 17 may drive the motor accordingly.

The motor driving module 17 may be connected to the output terminal of the first electronic switch 13. Thus, when the cell 21 is being discharged, it can supply power to the motor.

To conclude, the battery management system may use the information sampling module 3 to sample the information of the cell 21, and transmit the sampled information to the main control module 11. The main control module 11 may then determine whether the information of the cell 21 is abnormal. When the information of the cell 21 is abnormal, the first electronic switch 13 or the second electronic switch 14 may be turned off. Thereby the battery explosion due to excessive temperature can be avoided.

The information of the cell 21 sampled by the information sampling module 3 may also be transmitted to the management module 23. The management module 23 may determine whether the information of the cell 21 is abnormal. When the information of the cell 21 is abnormal, the discharge switch 25 or the charge switch 26 may be turned off. Thereby, the battery explosion because of excessive temperature can be avoided.

The battery management system can also use the temperature sampling unit 32 to sample the temperature of the cell 21, and transmit the sampled temperature to the management module 23. The management module 23 may determine whether the temperature of the cell 21 is higher than the preset temperature. When the temperature of the cell 21 is higher than the preset temperature, the discharge switch 25 or the charge switch 26 may be turned off. Thereby, the battery explosion due to excessive temperature can be avoided.

According to the above description, the battery management system provides two protection units to protect the cell 21. Thus, when one does not work, the other one can still protect the cell 21 effectively. In addition, when any one protection unit loses its accuracy because of surrounding environment, the other one can still precisely protect the cell 21.

Furthermore, the battery management system can further include the voltage sampling unit 241 to sample the voltage of the cell 21, and the current sampling unit 242 to sample the current of the cell 21. When either the voltage or current is out of the predetermined range, either the discharge switch 25 or the charge switch 26 can be turned off, so as to protect the cell 21.

Numerous details are set forth in the disclosure. However, it should be appreciated that the disclosure can be implemented without these specific details. Note that the embodiments referenced above are merely some but not all embodiments of the disclosure, and those of skill in the art can make numerous substitutions and modifications to the disclosure without departing from the spirits and scope of the disclosure. Any of these substitutions and modifications shall all fall within the protection of the disclosure. And the appended claims shall prevail with regards to the scope of the disclosure.

What is claimed is:

1. A battery management system for human-machine interaction vehicles, comprising:
    a battery pack, comprising:
        a cell;
        a battery pack charge-discharge module;
        a management module;
        a discharge switch; and
        a charge switch; and
    an information sampling module configured to sample information of the cell and transmit an information signal to the management module; wherein
    the cell is connected to a discharge terminal of the battery pack charge-discharge module through the discharge switch, and a control terminal of the discharge switch is connected to the management module; the cell is connected to a charge terminal of the battery pack charge-discharge module through the charge switch, and a control terminal of the charge switch is connected to the management module; the management module determines whether the cell is abnormal according to the information signal, when the cell is determined to be abnormal, the discharge switch is turned off during the cell being discharged and the charge switch is turned off during the cell being charged.

2. The battery management system of claim 1, wherein the information sampling module comprises a temperature sampling unit configured to sample temperature of the cell and transmit a temperature signal to the management module; the management module determines whether the temperature of the cell is higher than a preset temperature, when the temperature of the cell is higher than the preset temperature, the discharge switch is turned off by the management module during the cell being discharged, and the charge switch is turned off by the management module during the cell being charged.

3. The battery management system of claim 1, wherein the information sampling module comprises a voltage sampling unit connected to the cell and the management module and configured to sample a voltage of the cell and transmit a voltage signal to the management module; when the management module determines that the voltage of the cell is out of a predetermined range, the discharge switch is turned off by the management module during the cell being discharged, and the charge switch is turned off by the management module during the cell being charged.

4. The battery management system of claim 1, wherein the information sampling module comprises a current sampling unit connected to the cell and the management module and configured to sample a current of the cell and transmit a current signal to the management module; when the management module determines that the current of the cell is out of a predetermined range, the discharge switch is turned off by the management module during the cell being discharged, and the charge switch is turned off by the management module during the cell being charged.

5. The battery management system of claim 1, further comprising a main control board, which comprises a main control module connected to the management module and a warning module, wherein the management module further transmits the information signal from the information sampling module to the main control module, which thus determines whether the cell is abnormal according to the information signal; and the main control module controls the warning module to issue alarm signals when the cell is determined to be abnormal.

6. The battery management system of claim 1, further comprising a main control board, which comprises a main control module connected to the management module and a display module, wherein the management module further transmits the information signal from the information sampling module to the main control module, which thus determines whether the cell is abnormal according to the information signal; and the main control module controls the display module to display information of the cell when the cell is determined to be abnormal.

7. The battery management system of claim 6, wherein the main control board further comprises a first communication module connected to the main control module, and the battery pack further comprises a second communication module connected to the management module; and the first communication module is connected to the second communication module to communicate information through the first and second communication modules.

8. The battery management system of claim 6, wherein the main control board further comprises an external energy source interface and a main charge-discharge module, the main charge-discharge module is connected to the external energy source interface, and to the battery pack charge-discharge module.

9. The battery management system of claim 8, wherein the main control board further comprises a first electronic switch and a second electronic switch, a control terminal of the first electronic switch is connected to the main control module, an input terminal of the first electronic switch is connected to a discharge terminal of the main charge-discharge module, and an output terminal of the first electronic switch is connected to loads; a control terminal of the second electronic switch is connected to the main control module, an input terminal of the second electronic switch is connected to the external energy source interface, and an output terminal of the second electronic switch is connected to a charge terminal of the main charge-discharge module; wherein the main control module controls the first electronic switch to turn on and off according as to enable the cell to supply power to the loads or otherwise, the main control module also controls the second electronic switch to turn on and off according as to enable a connected external power supply to charge the cell through the external energy source interface or otherwise.

10. The battery management system of claim 9, wherein the loads comprise a power module and a motor driving module.

11. The battery management system of claim 6, wherein the main control module is a main control central processing unit (CPU) arranged on the main control board.

12. The battery management system of claim 5, wherein the main control board further comprises a first communication module connected to the main control module, and the battery pack further comprises a second communication module connected to the management module; and the first communication module is connected to the second communication module to communicate information through the first and second communication modules.

13. The battery management system of claim 5, wherein the main control hoard further comprises an external energy source interface and a main charge-discharge module, the main charge-discharge module is connected to the external energy source interface and to the battery pack charge-discharge module.

14. The battery management system of claim 13, wherein the main control board further comprises a first electronic switch and a second electronic switch, a control terminal of the first electronic switch is connected to the main control module, an input terminal of the first electronic switch is connected to a discharge terminal of the main charge-discharge module, and an output terminal of the first electronic switch is connected to loads; a control terminal of the second electronic switch is connected to the main control module, an input terminal of the second electronic switch is connected to the external energy source interface, and an output terminal of the second electronic switch is connected to a charge terminal of the main charge-discharge module; wherein the main control module controls the first electronic switch to turn on and off according as to enable the cell to supply power to the loads or otherwise, the main control module also controls the second electronic switch to turn on and off according as to enable a connected external power supply to charge the cell through the external energy source interface or otherwise.

15. The battery management system of claim 14, wherein the loads comprise a power module and a motor driving module.

16. The battery management system of claim 5, wherein the main control module is a main control central processing unit (CPU) arranged on the main control board.

17. The battery management system of claim 1, wherein the discharge switch is a discharge metal-oxide-semiconductor field-effect transistor (MOSFET), and the charge switch is a charge MOSFET.

* * * * *

UNITED STATES PATENT AND TRADEMARK OFFICE
CERTIFICATE OF CORRECTION

PATENT NO. : 9,515,496 B1
APPLICATION NO. : 15/139380
DATED : December 6, 2016
INVENTOR(S) : Jiawei Ying It is certified that error appears in the above-identified patent and that said Letters Patent is hereby corrected as shown below:

On the Title Page

Item (30) Foreign Application Priority Data, should have added:
--Dec. 24, 2015 (CN) ...............2015 1 1035756
Dec. 24, 2015 (CN) ...............2015 1 0989143--.

Signed and Sealed this
Tenth Day of July, 2018

Andrei Iancu
*Director of the United States Patent and Trademark Office*